United States Patent [19]

Asal et al.

[11] E Patent Number: Re. 31,642

[45] Reissued Date of Patent: Aug. 7, 1984

[54] ANGLE AND TILT IMPLEMENT ASSEMBLY

[75] Inventors: Jerrold R. Asal, Joliet; James A. Olthoff, South Holland, both of Ill.

[73] Assignee: Caterpillar Tractor Co., Peoria, Ill.

[21] Appl. No.: 272,626

[22] PCT Filed: Jan. 29, 1979

[86] PCT No.: PCT/US79/00045

§ 371 Date: Jan. 29, 1979

§ 102(e) Date: Jan. 29, 1979

[87] PCT Pub. No.: WO80/01584

PCT Pub. Date: Aug. 7, 1980

Related U.S. Patent Documents

Reissue of:

[64] Patent No.: 4,221,267
Issued: Sep. 9, 1980
Appl. No.: 12,163
Filed: Jan. 29, 1979

[51] Int. Cl.[3] ..... E02F 3/76

[52] U.S. Cl. ..... 172/821

[58] Field of Search ..... 172/819-827, 172/459, 477

[56] References Cited

U.S. PATENT DOCUMENTS

| | | | |
|---|---|---|---|
| 2,749,630 | 6/1956 | Nave | 172/821 |
| 2,950,550 | 8/1960 | French | 172/821 |
| 3,083,480 | 4/1963 | Kirchler | 172/825 |
| 3,084,461 | 4/1963 | Beckford | 172/821 |
| 3,529,678 | 9/1970 | Teasdale | 172/821 |
| 3,598,186 | 8/1971 | Coontz | 172/445.2 |
| 3,631,930 | 1/1972 | Peterson | 172/821 |
| 3,670,825 | 6/1972 | Asal et al. | 172/821 |
| 3,773,116 | 11/1973 | Coontz | 172/821 |
| 3,991,832 | 11/1976 | Cooper | 172/825 |
| 4,013,132 | 3/1977 | Matsuzawa | 172/821 |
| 4,081,036 | 3/1978 | Yokoyama | 172/821 |
| 4,201,268 | 5/1980 | Frisbee | 172/821 |
| 4,281,721 | 8/1981 | Beals | 172/821 |

FOREIGN PATENT DOCUMENTS

| | | | |
|---|---|---|---|
| 2037848 | 7/1980 | United Kingdom | 172/821 |

OTHER PUBLICATIONS

International Harvester Parts Catalog of Model TD-8E Paydozer, 7/77, pp. 17-2, 17-3.

*Primary Examiner*—Richard J. Johnson
*Attorney, Agent, or Firm*—Claude F. White

[57] ABSTRACT

An implement assembly (12) includes an implement (16), such as, for example, a blade (22) of a work vehicle (10), pivotally connected to a frame (14) for supporting said blade (22). The blade (22) and frame (14) are closely positioned to the front of the work vehicle (10) for maximum stability and balance of the vehicle (10). In the implement assembly (12) first apparatus (18) tilts the blade (22) generally vertically. Second apparatus (20), such as, for example, angling cylinders (40,42), moves the blade (22) to preselected angles relative to the vehicle (10). A subframe (50) is pivotally connected to the frame (14) and second apparatus (20). The blade (22) moves along the subframe (50) during tilting and with the subframe (50) to the preselected angles. Use of the subframe (50) substantially eliminates lateral movement of the angle cylinders (40,42) during tilting for close mounting of the blade (22) and frame (14) without interference with the tractor (10) while minimizing weight of the implement assembly (12).

16 Claims, 2 Drawing Figures

ANGLE AND TILT IMPLEMENT ASSEMBLY

Matter enclosed in heavy brackets [ ] appears in the original patent but forms no part of this reissue specification; matter printed in italics indicates the additions made by reissue.

DESCRIPTION

1. Technical Field

The invention relates to an angling and tilting implement assembly associated with a work vehicle. More particularly, the invention relates to the use of a subframe pivotally connected to a frame supporting an implement and to means for angling and tilting said implement, said implement being controllably movable along said subframe during tilting operations and controllably movable with said subframe during angling operations.

2. Background Art

In the use of an implement on a work vehicle, it is desirable to position the implement and a frame supporting said implement closely to the front of said vehicle for improved balance and stability during vehicle operations. The present invention relates to apparatus permitting such positioning of the frame and implement while maintaining satisfactory implement operation and minimizing weight of the associated elements.

U.S. Pat. No. 2,950,550 which issued on Aug. 30, 1960, to J. L. French discloses a tractor blade movably connected to a blade supporting subframe by plates movably positioned in tracks of the blade. The subframe is pivotally connected to the main or C-frame of the vehicle and accommodates tilting and angling of the blade. U.S. Pat. Nos. 3,083,480 and 3,084,461 which issued on Apr. 2, 1963, to L. Kirchler and on Apr. 9, 1963, to J. J. Beckford, respectively, also disclose embodiments of a blade connected to a supporting subframe which is connected to a main or C-frame.

U.S. Pat. No. 3,670,825 which issued to J. Asal et al on June 20, 1972, discloses a vehicle blade having a subframe member pivotally connected thereto and to a main or C-frame. The subframe member moves in positioning plates on the blade for positioning the subframe ends relative to the blade. Blade mounted subframes in which the subframes are connected to main or C-frames are also disclosed in the following: U.S. Pat. No. 4,013,132, Matsuzawa, Mar. 22, 1977; U.S. Pat. No. 3,773,116, Coontz, Nov. 20, 1973; and U.S. Pat. No. 3,529,678, Teasdale, Sept. 22, 1970. U.S. Pat. No. 3,991,832 which issued to Cooper on Nov. 16, 1976, discloses a frame and frame tower mounted blade which is pivotable relative to said frame owing to a plurality of ball and socket joints therebetween.

For example, a track-type tractor commonly has a frame mounted blade for performing various earthmoving or pushing operations. The blade is generally tiltable about a longitudinal axis of the vehicle or frame and movable through various angles relative to the tractor in a plane passing through said axis. These tilt and angle adjustments permit the controllabled positioning of the blade for more flexible use in the varying situations encountered during work operations. Hydraulic cylinders commonly perform these tilt and angle operations with the cylinders being connected to the frame and blade in preselected locations.

The blade is most commonly connected to and supported by a main or C-frame of the associated tractor.

The hydraulic cylinders which "angle" the blade are each positioned between a respective track and the body of the tractor. In "tilting" the blade, the angle cylinders, of necessity, move laterally and can interfere with the tracks or body of the vehicle owing to their connection to the blade. This lateral movement limits the degree of tilt available and necessitates positioning the blade and forward portion of the C-frame an undesirable distance from the tractor in order to maintain satisfactory tilt and angle parameters. The resultant weight forward of the tractor can also decrease stability and balance of the vehicle for certain operations.

In some blade assembly embodiments, the blade has been mounted to a subframe which is in turn pivotally connected to the main or C-frame. The subframe thus supports the blade. The angle cylinders are connected to the C-frame and to either the subframe or the blade, but the tilt cylinders are connected to said subframe and the blade. This subframe arrangements tends to permit greater freedom of tilting and angling. However, the weight of the subframe necessary to support the blade, plus lateral movement of the angling cylinders if connected directly to the blade, also can decrease stability and balance of the vehicle and limit blade movement necessary for some operations.

Therefore, it is desirable to provide an implement assembly which provides for mounting of the blade and support frame at a position close to the front of the associated tractor.

DISCLOSURE OF INVENTION

In one aspect of the present invention, an implement assembly has a frame having a longitudinal axis and an implement pivotally connected to said frame. First means is provided for controllably pivotally moving said implement about the longitudinal axis. Second means is provided for controllably pivotally moving said implement in a plane passing through said longitudinal axis. The implement assembly has a subframe pivotally connected to said frame and said second means and positioned adjacent and in contactable relationship with said implement. The implement is pivotally movable about said longitudinal axis along said subframe and pivotally movable in said plane with said subframe.

In another aspect of the present invention, an implement assembly has a subframe, an implement, and a frame having a longitudinal axis. The subframe is pivotally connected to the frame. First means is provided for controllably pivotally moving said implement about the longitudinal axis. Second means is provided for controllably pivotally moving said implement in a plane passing through said longitudinal axis. In said implement assembly, the implement is directly pivotally connected to said frame and the subframe is positioned adjacent and in contactable relationship with said implement and connected to said second means.

The implement is, for example, a blade of a track-type tractor. The blade and frame supporting said blade are desirably closely positioned to the front of the tractor for better stability and balance. The second means, such as angling hydraulic cylinders, is connected to the subframe. Use of the first means to "tilt" the blade moves said blade relative to and alongside the subframe which eliminates lateral movement of the angling hydraulic cylinders. The blade and frame can thus be closely positioned to the front of the tractor without interference of said cylinders with the tractor and the weight of the implement assembly is minimized by said configuration of the implement assembly.

BEST MODE FOR CARRYING OUT THE INVENTION

Figure 1:
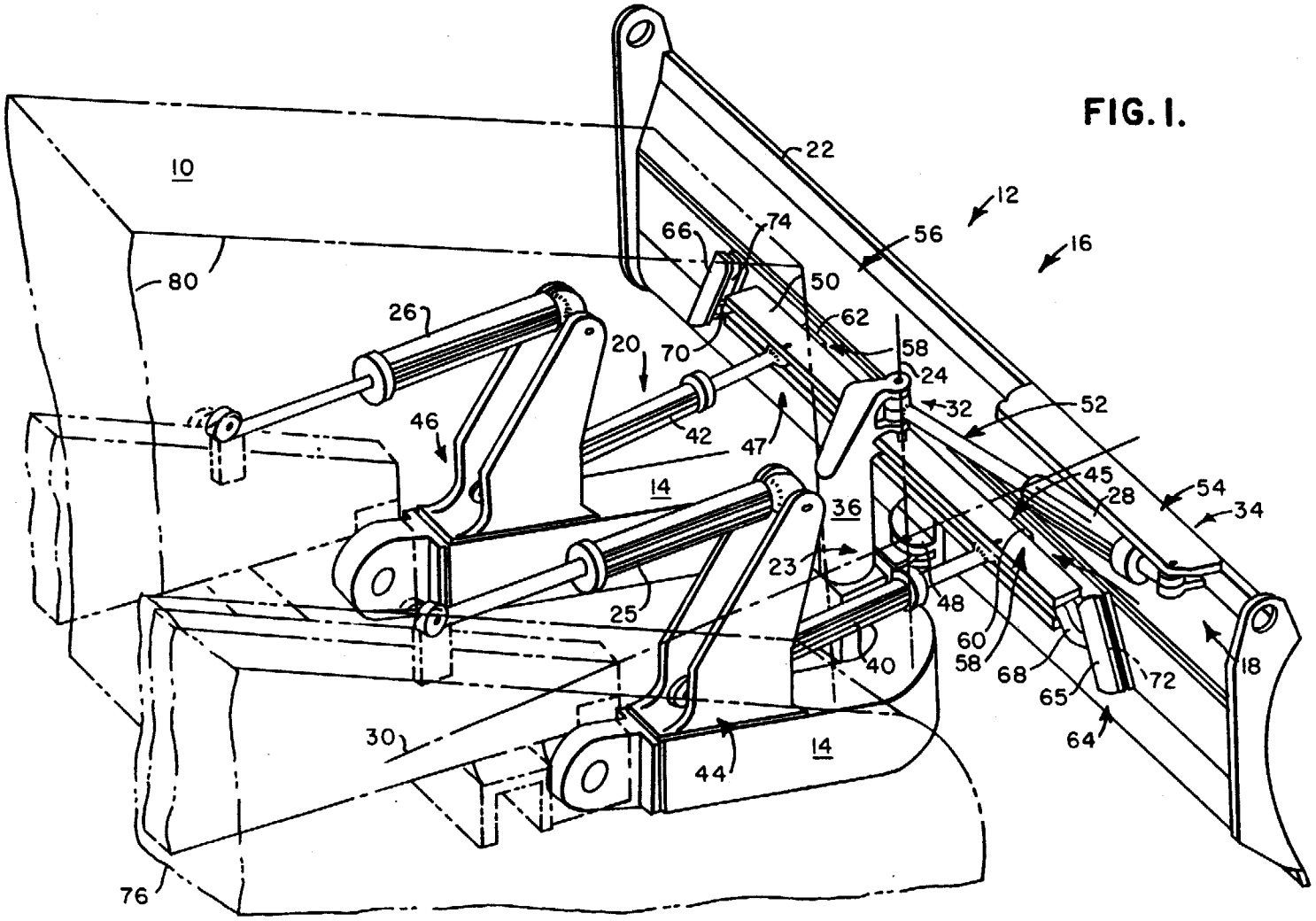
FIG. 1 is a diagrammatic perspective view showing an embodiment of the invention on a track-type tractor.

Referring to the drawings, a work vehicle 10 has an implement assembly 12. The work vehicle 10 is shown, for example, as a track-type tractor 10. The implement assembly 12 includes a frame 14, an implement 16 and first and second means 18,20. The implement 16 is, for example, a blade 22. The blade 22 is directly pivotally connected to the frame 14. Said blade 22 is shown, for example, connected to said frame 14 through a pivotal connection 23 which defines a substantially vertical axis 24, as will be hereinafter more fully explained. The frame 14 is of a "C" configuration and of a construction sufficient for supporting the blade 22 by the direct connection with said blade 22. Said frame 14 is pivotally connected to the tractor 10 and first and second hydraulic lift cylinders 25,26 controllably pivotally move the frame 14 relative to the tractor 10 for raising and lowering the blade 22.

Figure 2:
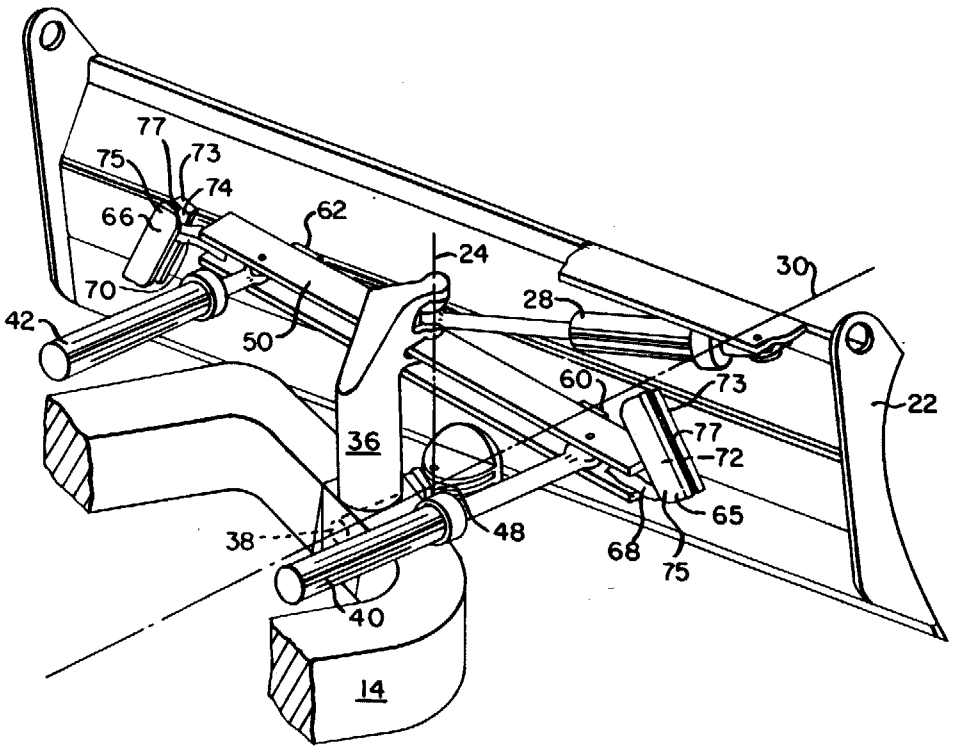
FIG. 2 is a diagrammatic perspective view showing the embodiment of FIG. 1 in greater detail.

The first means 18, such as a hydraulic tilt cylinder 28, is provided for controllably pivotally moving the blade 22 about a longitudinal axis 30 of the frame 14 and relative to the frame 14. Said first means 18 or tilt cylinder 28 is preferably pivotally connected to said frame 14 on the vertical axis 24 of the pivotal connection 23 and pivotally movable about said vertical axis 24. The tilt cylinder 28 has first and second ends 32,34. The first end 32 is pivotally connected to the frame 14 on the vertical axis 24, preferably through a tower member 36 of said frame 14. The second end 34 is pivotally connected to the blade 22. Said tilt cylinder ends 32,34 can also be reversed. The tilt cylinder 28 is thus controllably actuatable to controllably "tilt" the blade 22 about the longitudinal axis 30 owing to the orientation of a rotatable pin 38 in the pivotal connection 23 of the frame 14 with the blade 22, as is best seen in FIG. 2.

The second means 20, such as first and second hydraulic angle cylinders 40,42, is provided for controllably pivotally moving the blade 22 in a plane passing through the longitudinal axis 30. Said blade 22 controllably pivotally moves relative to the frame 14. The first and second angle cylinders 40,42 each have first and second ends 44,45;46,47. Said first ends 44,46 are pivotally connected to the frame 14. Said second ends 45,47 are positioned relative to the blade 22 as will be hereinafter discussed. Said angle cylinders 40,42 can also be reversed. The angle cylinders 40,42 are controllably actuatable to controllably "angle" the blade 22 in the plane passing through the longitudinal axis 30 owing to a pinned joint 48 defining the vertical axis 24 in the pivotal connection 23 of the frame 14 with the blade 22. Said plane is defined by the relative tilt position of the blade 22 owing to moving or tilting said blade 22 about the longitudinal axis 30.

The blade and frame construction above discussed are well known in the earthmoving art. The first and second means 18,20 are also well known in the earthmoving art and are commonly used to controllably position a blade or other implement relative to the tractor for performing different work functions.

The implement assembly 12 has a subframe 50 pivotally connected to the frame 14 and the second means 20 or angle cylinders 40,42. Said subframe 50 is positioned adjacent and in contactable relationship with the blade 22. Therefore, the subframe 50 is free from connection with the blade 22. The direct pivotal connection of the blade 22 to the frame 14 thus by definition excludes a connectin of said blade 22 and frame 14 through the subframe 50. As is shown, the subframe 50 is subtantially free from forces of gravity exerted on the blade 22. The frame 14 supports the blade 22 through the pivotal connection 23 with said blade 22.

The blade 22 is pivotally movable about the longitudinal axis 30 of the frame 14 along said subframe 50. In other words, the blade 22 moves relative to and alongside the subframe 50 in response to "tilting" said blade 22. Preferably, the blade 22 is pivotally slidably movable about the longitudinal axis 30 along said subframe 50. Said blade 22 is pivotally movable in said plane passing through the longitudinal axis 23 with said subframe 50. In other words, the blade 22 and subframe 50 move one with the other in said plane, such as during "angling" operations of the blade 22. The relationship of said subframe 50 and the associated elements will be hereinafter more fully discussed.

The subframe 50 has a middle portion 52 and first and second end portions 54,56 and is pivotally connected at the middle portion 52 to the frame 14. It is desirable that the subframe 50 be pivotally connected to said frame 14 on the vertical axis 24 and pivotally movable about said vertical axis 24. Said subframe 50 is connected to the frame 14 at the tower member 36 of said frame 14. The second ends 45,47 of the angle cylinders 40,42 are pivotally connected to the subframe 50. Said second ends 45,47 are each connected to a respective one of the first and second end portions 54,56 of said subframe 50. The second end 45 of the first angle cylinder 40 is shown, for example, connected to said first end portion 54.

The subframe 50 also has a bearing pad 58. The bearing pad 58 has first and second portions 60,62 each positioned on the first and second end portions 54,56 of the subframe 50, respectively. The bearing pad 58 abuts the blade 22 in response to moving the blade 22 with said subframe 50. The bearing pad 58 is in slidable contact with said blade 22 in response to moving said blade 22 along the subframe 50. In tilting operations, the tilt cylinder 28 exerts opposing forces on the blade 22 and frame 14 to slide said blade 22 along the bearing pad 58 to a desired tilt position.

Controllably actuating the angle cylinders 40,42 to "angle" the blade 22 exerts forces on the subframe 50. Said subframe 50 is of a construction sufficient for receiving and transmitting generally horizontal forces exerted on the blade 22, such as those above mentioned or those exerted on the blade 22 during earthmoving operations. The forces exerted by the angling cylinders 40,42, for example, are received by the subframe 50 and transmitted through the bearing pad 58 to the blade 22 for pivotally moving or "angling" said blade 22 with said subframe 50. The subframe 50 and blade 22 both pivotally move one with the other about the vertical axis 24 owing to their respective pivotal connections with the frame 14 on said vertical axis 24.

The implement assembly 10 includes third means 64 for maintaining the subframe 50 at a preselected position relative to the blade 22 in response to pivotally moving said blade 22 about the longitudinal axis 30 along said subframe 50. The third means 64 includes a first guiding element 65 connected to the blade 22. The implement assembly 10 preferably includes a second guiding element 66 connected to the blade 22. Each of said guiding elements 64,66 in the embodiment shown are of a configuration sufficient for engageably maintaining the first and second end portions 54,56 of the subframe 50, respectively, at respective preselected positions relative to said blade 22 in response to pivotally moving said blade 22 about the longitudinal axis 30 along the subframe 50. Said preselected positions are hereinafter fully discussed.

The subframe 50 has first and second guide members 68,70 positioned on the first and second end portions 54,56 of the subframe 50, respectively. The guiding elements 65,66 each define an opening 72,74 between first and second blocks 73,75 in which the related guiding members 68,70 are engageably positioned. Said guide members 68,70 slide relative to the guide elements 65,66 in said respective openings 72,74. The blocks 73,75 are used to provide a wear resistant surface for the guide members 68,70. In tilting the blade 22, said blade 22 is moveable along the subframe 50 but is blocked from pivotally moving about the vertical axis 24 separate from the subframe 50 in response to forces exerted on said blade 22 during use of the implement assembly 12. The preselected positions of the subframe 50 relative to the blade 22 are thus defined relative to movement about the longitudinal axis 30 by the degree of tilt of the blade 22 and relative to movement in the plane passing through said axis 30 by the clearance of the guide members 68,70 in the respective related openings 72,74. Said clearances are adjustable owing to the use of shims 77 to determine the size of said openings 72,74.

It should be understood that the implement assembly 12 and work vehicle 10 can be of other configurations as is known in the art without departing from the invention.

Industrial Applicability

In the use of the implement assembly 12, actuation of the tilt cylinder 28 pivotally moves or tilts the blade 20 by sliding said blade 22 relative to the subframe 50 and along the bearing pad 58 of the subframe 50. Actuation of the angle cylinders 40,42 pivotally moves or angles the blade 22 by exerting forces on the subframe 50 to pivotally move said subframe 50 and the blade 22 one with the other. The blade 22 is shown both "tilted" and "angled" in FIG. 2.

The angle cylinders 40,42 are positioned between a respective track 76 (one of which is shown in outline in FIG. 1) and body 80 of the tractor 10 and aligned generally parallel to the longitudinal axis 30 of the frame 14. When actuated, said cylinders 40,42 each extend or retract to position the blade 22 at a desired angle while remaining generally parallel to the longitudinal axis 30 and free from interference with the tracks 76 or body 80. Actuation of the tilt cylinder 28 moves the blade 22 relative to the subframe 50 which results in substantially no lateral movement of the subframe connected angle cylinders 40,42. Therefore, the blade 22 and frame 14 can be positioned closely to the front of the tractor 10 while maintaining satisfactory extension of the angle cylinders 40,42 for maximum angling of the blade 22.

Weight of the implement assembly 12 is minimized in the present invention owing to the blade 22 being supported by the frame 14 through the pivotal connection 23 with said blade 22. The subframe 50 is of a construction sufficient to withstand substantially only the horizontal forces which are received and transmitted by said subframe 50, such as in angling the blade 22 or during earthmoving operations. The resultant reduction in front end weight of the tractor 10 substantially overcomes problems of balance associated therewith.

Other aspects, objects and advantages will become apparent from a study of the specification, drawings and appended claims.

We claim:

1. In an implement assembly (12) having a frame (14) having a longitudinal axis (30), an implement (16) [directly pivotally connected to said frame (14)], *a pivot connection (23) defining a substantially vertical axis (24) pivotally connecting said implement (16) directly to said frame (14)*, first means (18) for controllably pivotally moving said implement (16) about said longitudinal axis (30) relative to said frame (14) and second means (20) for controllably pivotally moving said implement (16) [in a plane passing through said longitudinal axis (30) relative to said frame (14), said frame (14) being of a construction sufficient for supporting said implement (16)] *about said substantially vertical axis (24)*, the improvement comprising:

a subframe (50) *having a middle portion(52)* pivotally connected to said frame (14) [and said second means (20) and positioned adjacent and in contactable relationship with said implement (16)] *on said substantially vertical axis (24)at a location vertically spaced from said pivot connection (23)of said implement (16) with said frame (14) and being pivotally movable about said axis (24)*; and said implement (16) being *totally supported by said frame (14)and* pivotally movable about said longitudinal axis (30) [along said subframe (50) and pivotally movable in said plane with said subframe (50)] *in sliding relationship with said subframe (50)*.

2. The implement assembly (12), as set forth in claim 1, wherein said subframe (50) is substantially free from forces exerted by gravity on said implement (16).

[3. The implement assembly (12), as set forth in claim 1, wherein said implement (16) is pivotally slidably movable about said longitudinal axis (30) along said subframe (50).]

[4. The implement assembly (12), as set forth in claim 1, wherein said pivotal connection (23) of the implement (16) with the frame (14) defines a substantially vertical axis (24) and said subframe (50) is pivotally connected to said frame (14) on said vertical axis (24) and pivotally movable about said vertical axis (24).]

5. The implement assembly (12), as set forth in claim [4] *1*, wherein said first means (18) is pivotally connected to the frame (14) on said vertical axis (24) and pivotally movable about said vertical axis (24).

6. The implement assembly (12), as set forth in claim 1, wherein said first and second means (18,20) include tilt (28) and first angle (40) hydraulic cylinders, respectively, said cylinders (28,40) each having first and second ends (32,34;44,45) said first and second (32,34) ends of the tilt cylinder (28) being pivotally connected to the frame (14) and implement (16), respectively, said first and second ends (44,45) of the first angle cylinder (40) being pivotally connected to the frame (14) and subframe (50), respectively.

7. The implement assembly (12), as set forth in claim 1, including third means (64) for maintaining said subframe (50) at a preselected position relative to said implement (16) in response to pivotally moving said implement (16) about the longitudinal axis (30) [along said subframe (50)].

8. The implement assembly (12), as set forth in claim 7, wherein said third means (64) includes a first guiding element (65) connected to the implement (16) and defining an opening (72) and wherein the subframe (50) has a first guide member (68) movably positioned in said opening (72).

[9. The implement assembly, as set forth in claim 1, wherein the subframe (50) has a middle portion (52) and first and second end portions (54,56) and is pivotally connected at the middle portion (52) to said frame (14) and the second means (20) includes first and second angle cylinders (40,42) each having first and second ends (44,45;46,47), said first ends (44,46) each being connected to said frame (14), said second ends (45,47) each being connected to a respective one of the first and second end portions (54,56) of said subframe (50).]

10. The implement assembly (12), as set forth in claim [9] *1*, including first and second guiding elements (64,66) connected to said implement (16) and each being of a configuration sufficient for maintaining said first and second end portions (54,56) of said subframe (50), respectively, at respective preselected positions relative to said implement (16) in response to pivotally moving said implement (16) about said longitudinal axis (30) [along said subframe (50)].

11. The implement assembly (16), as set forth in claim 1, wherein said subframe (50) is of a construction sufficient for receiving and transmitting generally horizontal forces exerted on said implement (16).

[12. The implement assembly (12), as set forth in claim 1, wherein said subframe (50) has a bearing pad (58) abutting said implement (16) in response to moving said implement (16) with said subframe (50) and in slidable contact with said implement (16) in response to moving said implement (16) along said subframe (50).]

[13. In an implement assembly (12) having a frame (14) having a longitudinal axis (30), a subframe (50) pivotally connected to said frame (14), an implement (16) associated with said subframe (50), first means (18) for controllably pivotally moving said implement (16) about the longitudinal axis (30) relative to said frame (14) and second means (20) for controllably pivotally moving said implement (16) in a plane passing through said longitudinal axis (30) relative to said frame (14), said frame (14) being of a construction sufficient for supporting said implement (16), the improvement comprising:

said implement (16) being directly pivotally connected to said frame (14); and said subframe (50) being positioned adjacent and in contactable relationship with said implement (16) and connected to said second means.]

[14. The implement assembly (12), as set forth in claim 13, wherein said subframe (50) is substantially free from forces of gravity exerted on said implement (16).]

[15. The implement assembly (12), as set forth in claim 13, wherein said subframe (50) is of a construction sufficient for receiving and transmitting generally horizontal forces exerted on said implement (16).]

16. An implement assembly (12), comprising:

an implement (16);

a frame (14) having a longitudinal axis (30) [and being pivotally connected to said implement (16) and of a construction sufficient for supporting said implement (16)]; *a pivot connection (23) pivotally connecting said implement (16) directly to said frame (14) and defining a substantially vertical axis (24) normal to said longitudinal axis (30)*;

first means (18) for controllably pivotally moving said implement (16) about said longitudinal axis (30) relative to said frame (14), said first means (18) including a hydraulic tilt cylinder (28) having first and second ends (32,34) and being connected at the first end (32) to said frame (14) and at said second end (34) to said implement (16);

second means (20) for controllably pivotally moving said implement (16) in a plane passing through said longitudinal axis (30) relative to said frame (14), said second means (20) including a first hydraulic angle cylinder (40) having first and second ends (44,45) and being pivotally connected at the first end (44) to the frame (14) and at the second end (45) to said subframe (50);

a subframe (50) *having a middle portion (52)* pivotally connected to said frame (14) *on said substantially vertical axis (24) at a location vertically spaced from said pivot connection (23) of said implement (16) with said frame (14)* in and being pivotally movable about said axis *(24)*; and positioned adjacent and in *sliding* contactable relationship with said implement (16) and being substantially free from forces exerted by gravity on said implement (16);

a first guiding element (64) connected to the implement (16) and being of a configuration sufficient for maintaining said subframe (50) at a preselected position relative to said implement (16) in response to pivotally moving said implement (16) about the longitudinal axis (30) along said subframe (50); and said implement (16) being *totally supported by said frame (14) and* pivotally movable about said longitudinal axis (30) [along said subframe (50) and pivotally movable in said plane with said subframe (50)].

* * * * *